United States Patent [19]

Merli et al.

[11] 4,162,698
[45] Jul. 31, 1979

[54] RADIAL PNEUMATIC TIRES PROVIDED WITH A STRUCTURE FOR STIFFENING THE WALLS

[75] Inventors: Claudio Merli, Cormano; Carlo Francia, Monza, both of Italy

[73] Assignee: Euteco S.p.A., Milan, Italy

[21] Appl. No.: 835,757

[22] Filed: Sep. 22, 1977

[30] Foreign Application Priority Data

Oct. 5, 1976 [IT] Italy .................................. 27993A/76

[51] Int. Cl.² .......................... B60C 9/08; B60C 15/00
[52] U.S. Cl. ........................... 152/354 RB; 152/362 R
[58] Field of Search ................... 152/354, 356, 357 R, 152/362 R; 156/132

[56] References Cited

U.S. PATENT DOCUMENTS

| | | | |
|---|---|---|---|
| 3,339,610 | 9/1967 | Fausti et al. | 152/354 |
| 3,625,271 | 12/1971 | Hutch | 152/354 |
| 3,658,639 | 4/1972 | Wirth | 152/354 |
| 3,722,567 | 3/1973 | Delobelle | 152/354 |
| 3,904,463 | 9/1975 | Boileau | 152/362 RX |

FOREIGN PATENT DOCUMENTS

| | | | |
|---|---|---|---|
| 1505025 | 5/1969 | Fed. Rep. of Germany | 152/362 R |
| 2237772 | 2/1975 | France | 152/362 R |

*Primary Examiner*—Randolph A. Reese
*Attorney, Agent, or Firm*—Sughrue, Rothwell, Mion, Zinn and Macpeak

[57] ABSTRACT

A pneumatic tire cover with a radial carcass in which at least one ply of the carcass is folded upon itself by a prefixed amount, along its longer sides, that is, in those parts of the ply which are anchored to the bead cores about which they are folded or which, not being folded around the bead cores, reach the zone of the cover in proximity to the bead cores themselves.

6 Claims, 22 Drawing Figures

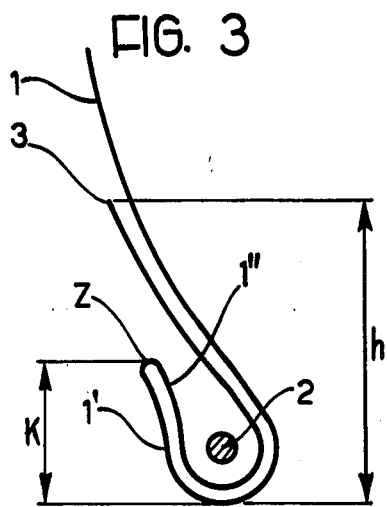
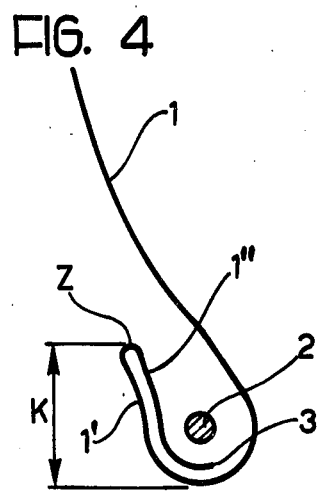
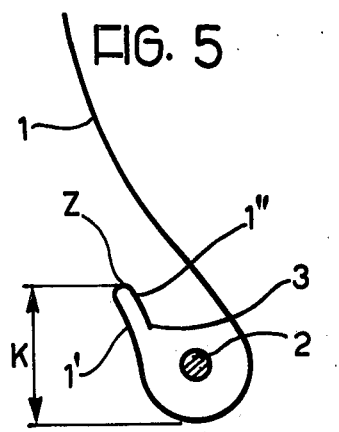
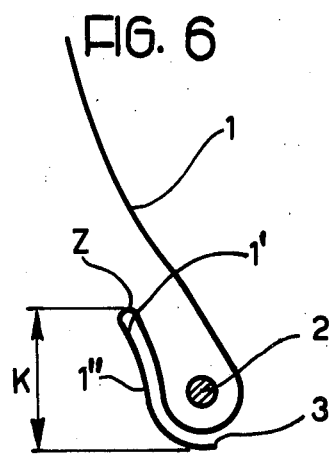
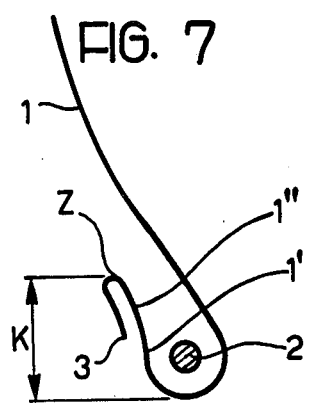
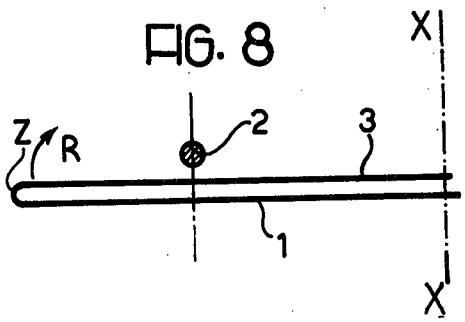

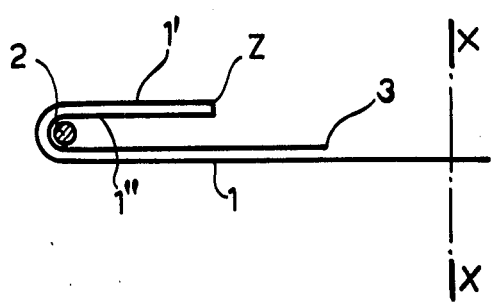
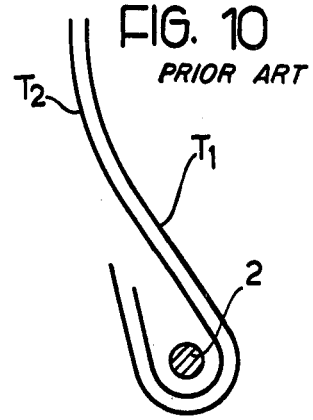
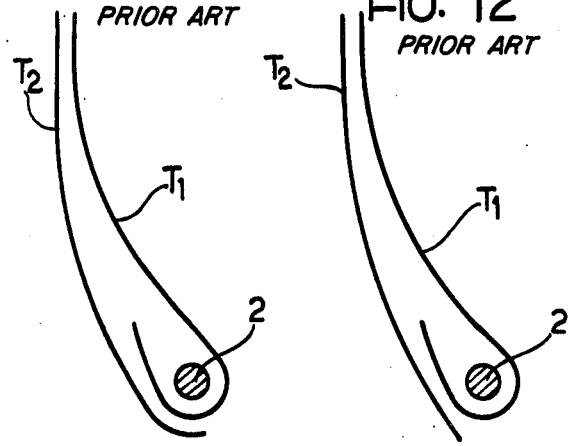
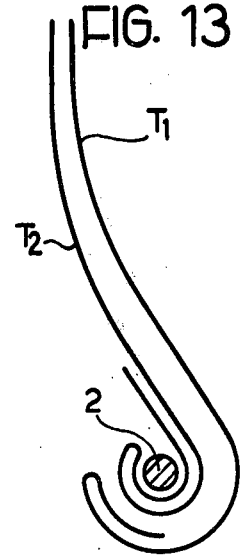
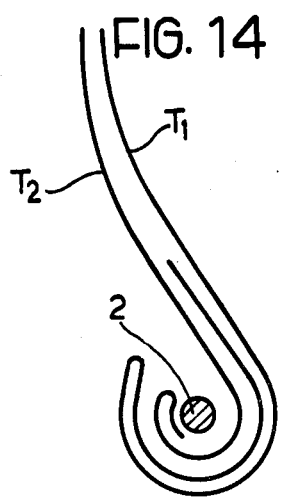
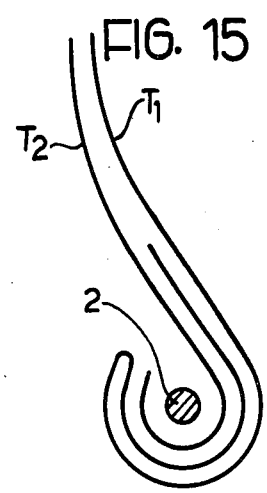

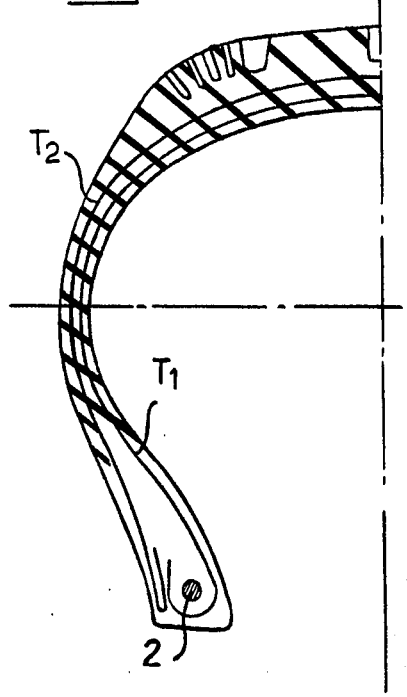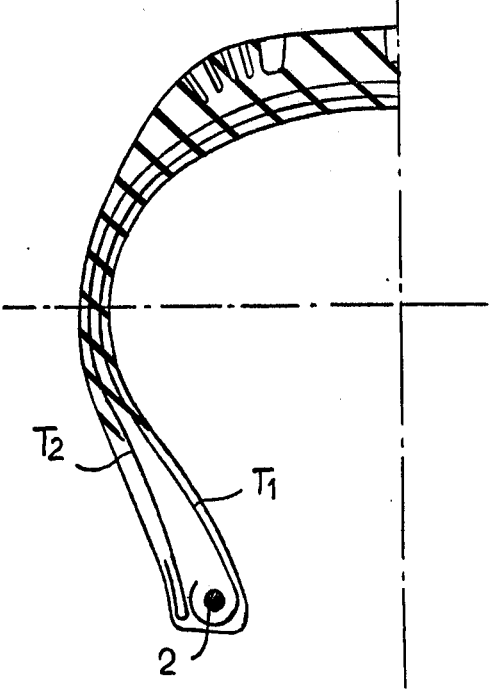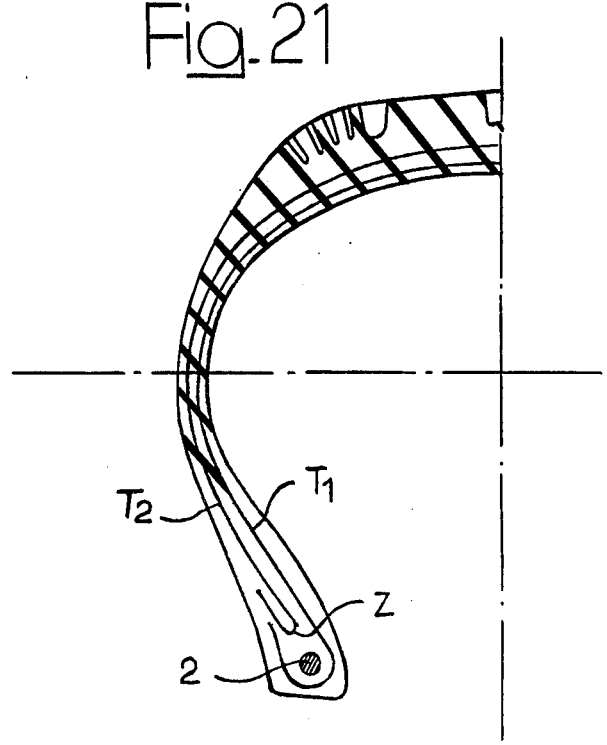

RADIAL PNEUMATIC TIRES PROVIDED WITH A STRUCTURE FOR STIFFENING THE WALLS

BACKGROUND OF THE INVENTION

The present invention relates to pneumatic tires for wheels of any type, which are provided with a radial carcass, that is with a carcass formed by one or more plies the threads (fine cords) of which lie in planes passing through the axis of rotation of the tire, or form small angles with said planes.

Tires with radial plies have notable advantages compared with those provided with a carcass having cross plies.

In the latter the direction of the threads is alternately crossed in passing from one ply to that immediately following.

It is however known that radial tires have, in correspondence with their walls, an excessively high flexibility which on one hand has the advantage of a considerable degree of comfort, while on the other hand can lead, under working conditions, to excessive bending of the walls and therefore to tangential movements.

This can in consequence cause premature wearing out of the tire in those areas of the walls, connected with the bead, which are in contact with the mounting rim.

In order to eliminate, or at least to reduce, this disadvantage, different solutions have been considered which are essentially based on devices adapted to increase the rigidity of the area of the walls connected to the bead.

Therefore supplementary bands of plies have been introduced, crossing or not crossing each other and the radial plies of the carcass, and this to an extent dependent upon the degree of required rigidity.

Particularly effective seems to be the solution which entails the introduction of supplementary plies with threads parallel to or inclined to those of the carcass, made with materials of relatively low flexibility.

It will suffice to mention for this purpose the combination of a radial carcass of textile threads and of reinforcements, crossed with it, formed by metal filaments.

An example of such a solution is disclosed in the Italian Patent Specification No. 942,682.

The preceding solutions are, however, not without disadvantages taking into account the following considerations.

The added reinforcement materials are formed by fabrics different from those of the carcass, which have to be, therefore, prepared separately, cut to size, gathered and positioned separately during the manufacture of the tire. This causes complications in the process, with loss of time and high costs.

Furthermore, as the elements are detached the dangers of positioning and of faulty anchorage have to be considered. These elements can shift during molding and vulcanization of the tire and get into undesirable positions or into positions not completely suitable in view of the results one wishes to attain.

Finally said fabrics, of a different nature than those of the carcass, form heterogeneous elements the efficiency of which is difficult to foresee, especially if one takes into account the fact that one requires a gradual stiffening beginning with the most flexible zone of the wall of the tire, to the zone of the bead which is in itself relatively rigid.

Notwithstanding the said disadvantages very rigid fabrics are usually used as reinforcement elements for the walls of the tire.

In other words there is a tendency to use a minimum number of reinforcement elements in order to reduce the possibility of incorrect positionings and to simplify the process of preparation of the tires.

OBJECT OF THE INVENTION

It is an object of this invention to eliminate or at least greatly reduce the disadvantages disclosed above.

THE INVENTION

According to this invention, there is provided a tire cover with a radial carcass which has a stiffening structure in the junction zone, between the wall and the bead, wherein the stiffening is realized by doubling the ends of at least one of the plies forming the carcass, so as to create in at least one wall at least one rib in which the threads forming the ply are without any discontinuity.

Obviously to the radial carcass one adds after formation of same, a peripheral reinforcement with a width which is equal, or almost equal, to that of the tread of the tire.

In particular the threads of the plies which form the single layers of the peripheral reinforcement, are alternatively placed in a mainly longitudinal direction, forming angles from about 10° to 15° with the longitudinal plane of symmetry of the tire and this according to the known prior art.

Therefore according to the present invention at least one ply of the carcass is folded upon itself by a prefixed amount, along its longer sides, that is, in those parts of the ply which are anchored to the bead cores about which they are folded or which, not being folded around the bead cores, reach the zone of the cover in proximity to the bead cores themselves.

Such folding, which in effect constitutes a doubling of the ply itself over a definite area, can be carried out either during preparation of the plies, after being cut to size and before being packed in suitable rolls to be supplied to the forming machine, or directly on the forming drum of the mold of the carcass.

ADVANTAGES OF THE INVENTION

Such folding of the ply forms a rib in which the threads forming the ply do not present discontinuities and said rib has unexpectedly favorable characteristics in solving the problems relating to the stiffening of the walls of the tires as:

it constitutes by its nature a reinforcement of suitable flexural rigidity;

it does not undergo shifting during molding and vulcanization;

it has a high resistance to detachment with respect to the masses of surrounding elastomer;

it forms of itself, and as a function of the method of use, a form of anchorage of the ply, even in cases in which said ply is not anchored to the bead core;

it forms, lastly, a reinforcement element which combines the flexural rigidity, intended in the transverse sense of the section of the cover, with a circumferential rigidity and this makes the tire able to resist those forces caused by strong variation of motion (acceleration or braking) and which are transmitted by the thread of the tire (in contact with the ground) to the beads tightly joined to the rim.

The device for folding the ply onto its lateral ends, can be applied to plies of any nature, that is both to those formed by metal (steel) threads and to those formed by threads of natural, artificial or synthetic fabric such as for example rayon, polyamides and polyesters. Furthermore different materials can be used for the same ply or for different plies in the case of carcasses with more plies as later described.

In the description which follows the expressions "internal face" and "external face" will be used with respect to the bead core, in order to define according to the geometry of the carcass in the area of the bead, the position of an anchorage fold of a ply to the small rim, or the position of the folding upon itself of the ply at its end.

In particular by "internal face" (with respect to the bead core) is meant the face turned towards the internal concavity of the tire, destined to receive the inner tube, and by "external face" the opposite face.

BRIEF DESCRIPTION OF THE DRAWINGS

This invention will now be further described with reference to the accompanying drawings wherein:

FIG. 3 is a schematic transverse section showing, in an enlarged scale, a detail of the embodiment according to the FIG. 2;

FIGS. 4 and 5 are schematic transverse sections similar to that of the FIG. 3, which show further modified forms of the said embodiment according to the FIG. 2;

FIGS. 6 and 7 are schematic transverse sections showing modified forms of the embodiments according to the FIGS. 4 and respectively 5;

FIGS. 8 and 9 are schematic transverse sections showing two successive steps of the process by which is obtained the embodiment of FIG. 3;

FIGS. 10, 11 and 12 are schematic transverse sections similar to that of FIGS. 3 to 7, but showing embodiments of the prior art; comprising two plies;

FIGS. 13 to 19 are schematic transverse sections similar to that of FIGS. 10 to 12, showing details of tires according to the invention having carcasses formed with two plies;

FIGS. 21 and 22 are schematic transverse sections similar to that of FIG. 20, but showing two further embodiments according to the invention.

In all Figures similar elements are indicated by the same reference symbols.

DETAILED DESCRIPTION OF SOME EMBODIMENTS OF THE PRIOR ART AND OF THE INVENTION

Figure 1:
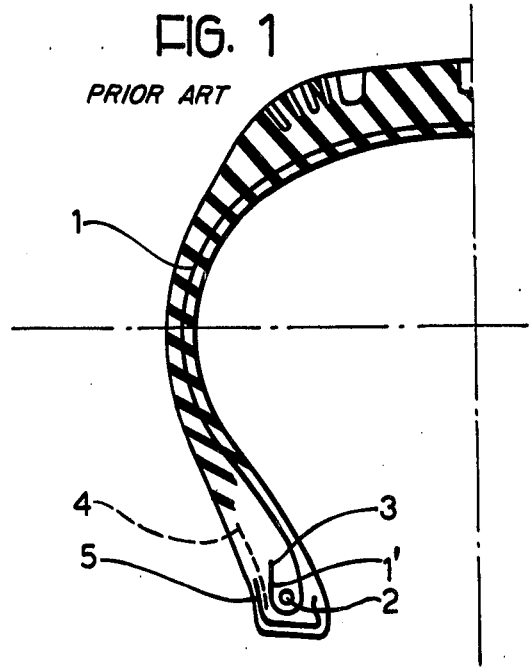
FIG. 1 shows schematically a half transverse section of a tire, manufactured according to the prior art.

FIG. 1 represents schematically the transverse section of a tire, manufactured according to the prior art, in the simpler case of a radial carcass formed by a single ply (1) which turns towards the outside anchoring itself to the bead core (2) and forms a fold or lapel or turn up (1') which terminates with its end (3) where the threads of the ply are cut.

In this Figure there is also shown the reinforcement (4) situated outside the fold (1') formed in the specific case by a band of woven steel threads, placed in such a way as to form an angle of 60° with respect to the threads of the carcass.

There is furthermore an element (5) called a "border", formed by a square fabric of woven threads, for example of polyamide, disposed parallel to the external concave surface of the bead and which terminates in the internal part of the bead itself after turning around the bead core.

The "border" is usually used as a protection against mechanical stresses during the fitting of the cover onto the wheel rim.

Figure 2:
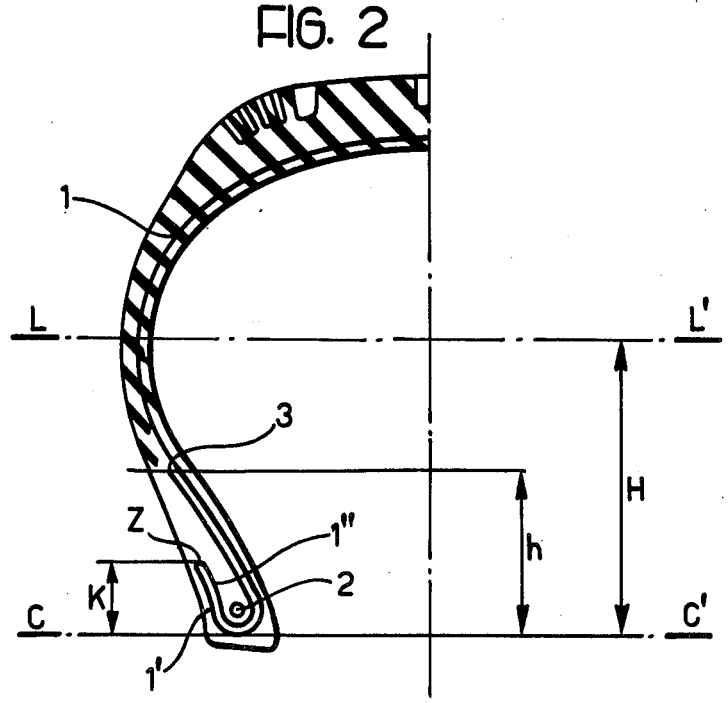
FIG. 2 is a schematic half transverse section of a tire according to one embodiment of this invention.

In the embodiment according to this invention shown in FIG. 2, in which there is a radial carcass formed by a single ply, the ply of the carcass (1) turns towards the outside around the bead core (2), forming the fold (1').

The ply is then folded back on itself with formation of the rib "Z" so that the folded back portion (1") is adherent to the fold (1'), bends around the bead core (2) adheres to the ply (1) and terminates in the end (3) where the threads are cut.

Still referring to FIG. 2 C—C' is the fitting line of the cover (or the supporting line for the beads) and L—L' the line joining the points of maximum width of the side walls of the inflated cover and "H" the distance between these two lines, the distance "K" which the rib "Z" can reach being conveniently between 0.1 H and 1.5 H.

In a particular case shown in FIG. 4, the end (3) of the ply is disposed in the area below the bead core (2), while in the case of the embodiment of FIG. 5 the end (3) of the ply does not succeed in anchoring itself below the bead core.

Therefore the distance h reached by the free end (3) of the ply can assume values from zero up to 1.5 times the distance "H" specified.

On parallel lines to the embodiments sketched in FIGS. 4 and 5, are shown those of FIGS. 6 and 7 which differ from the first by the fact that the folded edge of the ply turns towards the outside, instead of towards the inside.

Variants of this kind, even if not illustrated in the embodiments described later, do not depart from the scope of this invention.

Furthermore, in the description which follows, the embodiments shown schematically in FIGS. 3, 4 and 5 will assume many characteristic forms, to define the various possibilities of combination with other carcass plies, folded on themselves or not, when said carcass is formed by more than one ply.

In FIGS. 8 and 9 there is illustrated the process by which is obtained the embodiment of FIGS. 2 and 3.

More particularly referring to FIG. 8, numeral (1) shows the ply which is positioned already folded upon itself (or folded after its positioning on the drum) to one of its ends, so as to form the rib "Z", on a cylindrical drum of which X—X' is the center line.

When the bead core (2) is placed in position and the reinforced stretch of the ply is wound around it in the direction shown by the arrow "R" one obtains the configuration shown in FIG. 9, from which one passes to FIG. 3 when the cylindrical body of the carcass of FIG. 9, is shaped into a toric form by the usual methods.

In the case of covers comprising two or more plies there are known at present windings about the bead core called "open" or "closed".

For a better clarification we refer to FIGS. 10 and 11, in which are sketched two embodiments of the prior art.

In particular FIG. 10 shows schematically a cover in which the carcass is formed by two plies "T1" and "T2" which, keeping themselves parallel in the section of the cover, are both turned towards the outside, folded around the bead core (2), forming thus an open winding.

FIG. 11 shows a cover with two plies "T1" and "T2", the first of which is anchored to the bead core (2) turned towards the outside, while the second turns towards the inside, terminating with its extremity partially anchored in the area immediately below the bead core (2).

In FIG. 12 there is schematically shown another embodiment of the prior art, in which the ply "T2" ends at an even distance from the bead core (2); this is, therefore, concerned with a non-anchored ply.

Both FIGS. 11 and 12 form however, with slight variation, a typical example of closed winding.

According to the present invention it is possible to realize, in a carcass formed by two or more plies, open or closed windings, in all possible combinations, in which at least one ply among those anchored or not to the bead core is folded at the end in the way previously described, in such a way that the threads forming the ply form a rib in which said threads do not have any discontinuity.

Examples will now be given of covers with two plies subdividing the various cases between the two types of winding, that is the open and closed type.

In FIGS. 13 to 15 there are illustrated examples without limitations of windings of the open type and more particularly;

FIG. 13 shows schematically a cover with two plies according to this invention in which are combined a ply "T1" with a configuration similar to that of FIG. 4 and a ply "T2" with a configuration similar to that of FIG. 3;

FIG. 14 shows a sketch in which ply "T1" and "T2" have similar configurations to that of FIGS. 3 and 5 respectively;

FIG. 15 shows again a sketch in which the ply "T1" has the configuration of FIG. 3, while the ply "T2" is not folded on itself.

Figure 16:
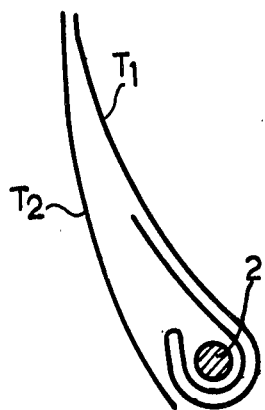

Among the sketches of the closed type we mention, as an example without limitations, those of FIGS. 16 to 19. More in particular:

in FIG. 16 the ply "T1" has the configuration of FIG. 3, while the ply "T2" is not folded on itself;

in FIG. 17 the ply "T2" is folded but not the ply "T1".

A possible and useful variant, still within the scope of this invention, is that described:

in FIG. 18 in which the edge of the ply "T2" is folded towards the inside.

Figure 19:
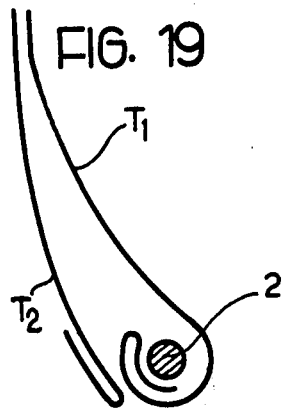
Figure 20:
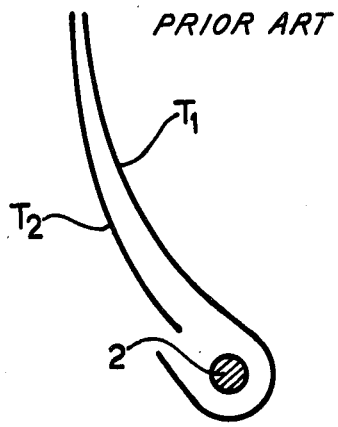
FIG. 20 is a schematic transverse section showing a detail of an other prior art tire having a carcass formed with two plies.

Finally:

in FIG. 19 the ply "T1" having a configuration similar to that in FIG. 4, is combined with the ply "T2" folded towards the outside;

in FIG. 20 a prior art embodiment is shown which constitutes a variation of what has been illustrated in FIG. 11, in which the end of the ply "T2" is positioned between the fold of ply "T1" and ply "T1" itself.

This scheme is not usually used as it does not provide consistency to the bead.

In other words it is not possible to confer on the bead a rigidity comparable to that obtained by adopting the arrangement of FIG. 12 and furthermore the ply "T2" does not remain sufficiently taut after the vulcanization of the cover.

Figure 22:
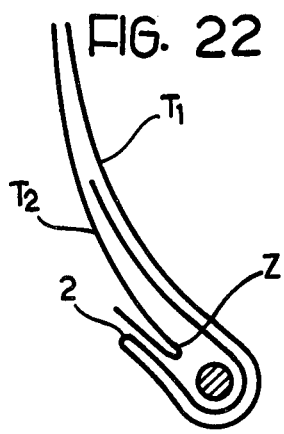

By applying the principle of this invention to said ply "T2" one can obtain, for example, the arrangements of FIGS. 21 and 22 and more in particular:

in FIG. 21 the ply "T1" is not folded, while the ply "T2" folded upon itself remains taut thanks to the rib "Z" and said ply "T2" confers a gradual rigidity beginning from the area of the wall up to the bead;

in FIG. 22 one uses a ply "T1" with the configuration of FIG. 3 and a ply "T2" folded on itself.

One can finally notice that in the cases illustrated in FIGS. 17 to 19, as also in FIGS. 21 and 22, the plies with the ends folded up and which are not wound around the bead core, still possess the characteristic of having the rib "Z" in the position nearest to the axis of rotation, with respect to any other point of their development.

FURTHER MODIFICATIONS OF THE EMBODIMENTS DESCRIBED

It is understood that the present invention is not limited to the example previously illustrated and it embraces practical variants which use the above specified principle.

Within the scope of the present invention are included all possible combinations which concern the realization of asymmetrical forming.

For example:

one or more folded plies according to what has been described are present in only one of the beads while in the other bead the winding arrangement is carried out according to the prior art;

in one of the beads one follows the open or closed winding scheme with one or more folded plies according to this invention, while in the other one follows a closed or respectively open winding scheme, still with one or more folded plies according to this invention;

schemes of equal shape and winding type are used in the two beads through one or more folded beads according to this invention and the distances of which from the rib formed by the folded ends are kept different and/or the distances from the ends of the edges of the band downstream of the rib are kept different.

Tires of this invention can contain in the area of the cavity of the bead and outside the plies of the carcass one or more layers of reinforcement formed by fabric bands of a material different from that of the carcass and/or one or more edges in a fabric with simple warp, or with weft and warp, said edges being parallel to the surface of the cover in the area of the cavity outside the bead and then folded towards the internal part.

Said reinforcements, in fabric or metallic material have the object of protecting the tire from the wear caused by curbs on the rim and are useful as a defence against mechanical stresses in the fitting of the cover to the rim.

We claim:

1. A pneumatic tire having an annular tread portion, a pair of axially spaced bead portions disposed radially inwardly relative to said tread portion, each bead portion including a substantially circular bead core, a pair of axially spaced side wall portions extending from said bead portions to said tread portion and a carcass ply structure having radially disposed reinforcing threads extending from one bead portion to the other bead portion, said carcass ply structure being comprised of at least two plies, one of said plies being turned back and anchored to each bead core along each edge thereof and the other of said plies being folded back upon itself adjacent each edge to form a rib disposed adjacent to but not anchored to the respective bead core and having the free edge thereof disposed between said rib and the line joining the points of maximum width of the side walls when the tire is inflated.

2. A pneumatic tire as set forth in claim 1, wherein said one of said plies which is anchored to said bead portions is disposed radially inwardly of the other of said plies.

3. A pneumatic tire as set forth in claim 2, wherein each rib is disposed between said one of said plies and the turned back portion thereof.

4. A pneumatic tire as set forth in claim 2, wherein said rib is disposed axially outwardly of the turned back portion of said one of said plies.

5. A pneumatic tire as set forth in claim 4, wherein the portion of said other of said plies which is folded back upon itself is disposed axially outwardly of said other of said plies.

6. A pneumatic tire as set forth in claim 4, wherein the folded back portion of the other of said plies is disposed axially inwardly of the other of said plies.

* * * * *